(12) United States Patent
Sakamoto et al.

(10) Patent No.: US 7,354,082 B2
(45) Date of Patent: Apr. 8, 2008

(54) BUMPER STRUCTURE FOR VEHICLE

(75) Inventors: Toshio Sakamoto, Fuchu-cho (JP);
Tsugio Fukube, Fuchu-cho (JP);
Michihisa Iwamoto, Fuchu-cho (JP);
Takahiro Tanaka, Fuchu-cho (JP);
Masayuki Sato, Fuchu-cho (JP);
Mikado Kawasaki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 56 days.

(21) Appl. No.: 11/333,126

(22) Filed: Jan. 17, 2006

(65) Prior Publication Data

US 2006/0157992 A1    Jul. 20, 2006

(30) Foreign Application Priority Data

Jan. 19, 2005    (JP) .............................. 2005-011439

(51) Int. Cl.
*B60R 19/52*    (2006.01)
(52) U.S. Cl. ....................................................... 293/115
(58) Field of Classification Search ................ 293/115, 293/102, 154, 155; 296/187.01, 187.03, 296/193.01, 193.02, 193.09, 193.1
See application file for complete search history.

(56) References Cited

U.S. PATENT DOCUMENTS 5,478,127 A * 12/1995 Chase ......................... 293/115
5,887,672 A    3/1999  Kimura
6,702,343 B1 *  3/2004  Stull ........................... 293/115
6,951,356 B1 * 10/2005  Stull ........................... 293/115
6,997,490 B2 *  2/2006  Evans et al. ................. 293/120
2005/0006913 A1 *  1/2005  Otte ........................... 293/115
2006/0249961 A1 * 11/2006  Flotzinger ................... 293/115

FOREIGN PATENT DOCUMENTS

| EP | 1 067 039 A1 | 1/2001 |
| FR | 2 821 817 A3 | 9/2002 |
| JP | 11-314552 | 11/1999 |
| WO | WO 2005/049300 A1 | 6/2005 |

* cited by examiner

*Primary Examiner*—H Gutman
(74) *Attorney, Agent, or Firm*—Brooks Kushman P.C.

(57) ABSTRACT

Disclosed is a bumper structure adapted to be attached to a front end of a vehicle, which is capable of preventing a fine member from being bent downward by its own weight after integrally forming a bumper body and a grill portion together, and avoiding a problem about deterioration in appearance of the grill portion which would otherwise be caused by the fin support remaining within the grill portion, so as to provide drastically enhanced appearance of the grill portion. A fin support (5, 5, 6, 6) is formed to allow an distal end thereof to extend toward an open zone on the upper side of an opening (X), and folded about a thin-wall portion (5a, 6a) in such a manner as to be engaged with an engagement pin (3a, - - - , 3a) at an edge of the opening (X) to support the fin member (4). After resin is cooled, thin-wall portion (5a, 6a) is cut off to remove the fin support (5, 5, 6, 6) from the inside of the opening (X).

5 Claims, 7 Drawing Sheets

BUMPER STRUCTURE FOR VEHICLE

BACKGROUND OF THE INVENTION

1. Field of the Invention

The present invention relates to the technical field of a bumper structure adapted to be attached to a front end of a vehicle.

2. Description of the Background Art

Generally, a vehicle, such as an automobile, is equipped with a bumper attached to a front end thereof to serve as a means to absorb a shock, and a front grille disposed above a central region of the bumper and formed with an opening for introducing radiator-cooling air into an engine compartment. The bumper and front grill are designed with the emphasis on aesthetic quality, because they serve as a face defining each vehicle's personality.

In this connection, Japanese Patent Laid-Open Publication No. 11-314552 discloses a structure designed to allow a bumper to be attached to a front grill formed separately from the bumper in such a manner as to prevent the grill from being damaged even if an impact force acts on the bumper rearward.

In some cases, for the purpose of reduction in production cost and improvement in aesthetic quality, a bumper and a front grill are integrally formed as a single-piece component, instead of being formed as discrete components. In these cases, they are generally formed as a single-piece component through an injection molding process using synthetic resin. When a bumper and a front grill are formed separately from one another, the bumper is typically made of a resin material having a relatively low rigidity, such as PP (polypropylene), in view of shock-absorbing performance, and the front grill is typically made of a resin material having a relatively high rigidity, such as ABS (acrylonitrile-butadiene-styrene) resin. In contrast, when a bumper and a front grill are integrally formed as a single-piece component, the bumper and the front grill are made of a resin material having a relatively low rigidity, to guarantee a function of the bumper as a shock-absorbing means. In this case, if a fin member as one of aesthetic elements integrally formed in the grill to extend horizontally in such a maimer as to bridge across an air-intake opening of the grill, the fin member is likely to be bent downward by its own weight before being cooled and solidified after completion of an injection molding process to cause a problem about deterioration in appearance of the grill and in aesthetic quality of the entire component serving as a vehicle's face.

For example, as measures against this problem, it is conceivable to employ a structure designed such a fin support is integrally formed in the fin member to extend vertically from the fin member, and an extended end of the fin support is connected to another fin member or an edge of an opening of the grill disposed adjacent vertically thereto. While this structure can prevent the problem about bending of the fin member, the fin support as a non-aesthetic element exists within the opening of the grill together with the fin member as an aesthetic element. The existence of the non-aesthetic fin support causes a new problem about deterioration in appearance of the grill and in aesthetic quality of the entire component serving as a vehicle's face.

Particularly in a front grill designed to have a small number of fin members so as to achieve a simple appearance, the fin support becomes highly visible, or the above problem becomes serious.

SUMMARY OF THE INVENTION

In view of the above problem, it is therefore an object of the present invention to provide a bumper structure adapted to be attached to a front end of a vehicle, capable of allowing a bumper body and a grill portion to be integrally formed as a single-piece component using a single resin material, while eliminating a problem about bending of a fin member extending horizontally across an air-intake opening of the grill portion without adverse affects on aesthetic quality of the bumper structure serving a vehicle's face.

In order to achieve the above object, the present invention provides a bumper structure made of a resin material and adapted to be attached to a front end of a vehicle, which comprises: a bumper body serving as a main body of the bumper structure; a grill portion integrally formed with the bumper body to have an air-intake opening therein; a fin member integrally formed in the grill portion to extend horizontally in such a manner as to bridge across the opening of the grill portion; a fin support integrally formed in the fin member to extend vertically from the fin member and have an anchor end formed as a thin-wall portion adapted to allow the fin support to be folded thereabout in a direction opposite to an extension direction thereof; and an engaging portion formed at either one of a distal end of said fin support and an edge of said grill portion and an engaged portion formed at the other one of said distal end of said fin support and said edge of said grill portion such that said engaging portion and said engaged portion are in engagement with each other when said fin support is folded about said thin-wall portion in said opposite direction.

According to the above bumper structure of the present invention, after completion of an injection molding process, the fin support is folded to allow the distal end thereof to be kept in engagement with the edge of the opening of the grill portion until the molded resin is cooled and solidified. Specifically, when the fin support is formed to extend upward from the fin member, it is folded downward to support the fin member from below. When the fin support is formed to extend downward from the fin member, it is folded upward to support the fin member from above in a hanging manner. In either case, the fin support can eliminate the problem that the fin member is bent downward by its own weight. Further, the anchor end of the fin support formed as the thin-wall portion allows the fin support to be readily folded.

After the molded resin is cooled and solidified, the fin support used for preventing bending (i.e., downward sagging) of the fin member can be readily cut away at its anchor end formed as the thin-wall portion. That is, the non-aesthetic fin support can be removed from the opening of the grill portion to maintain aesthetic quality of the bumper structure serving as a vehicle's face.

As above, the feature of the present invention is in that a fin support which will become unnecessary after being utilized in a production process of the bumper structure is designed to be integrally formed with the bumper structure and then readily removed before the bumper structure is attached to a front end of a vehicle. This makes it possible to provide drastically enhanced appearance of the grill in a simplified structure.

DESCRIPTION OF THE PREFERRED EMBODIMENTS

Figure 1:
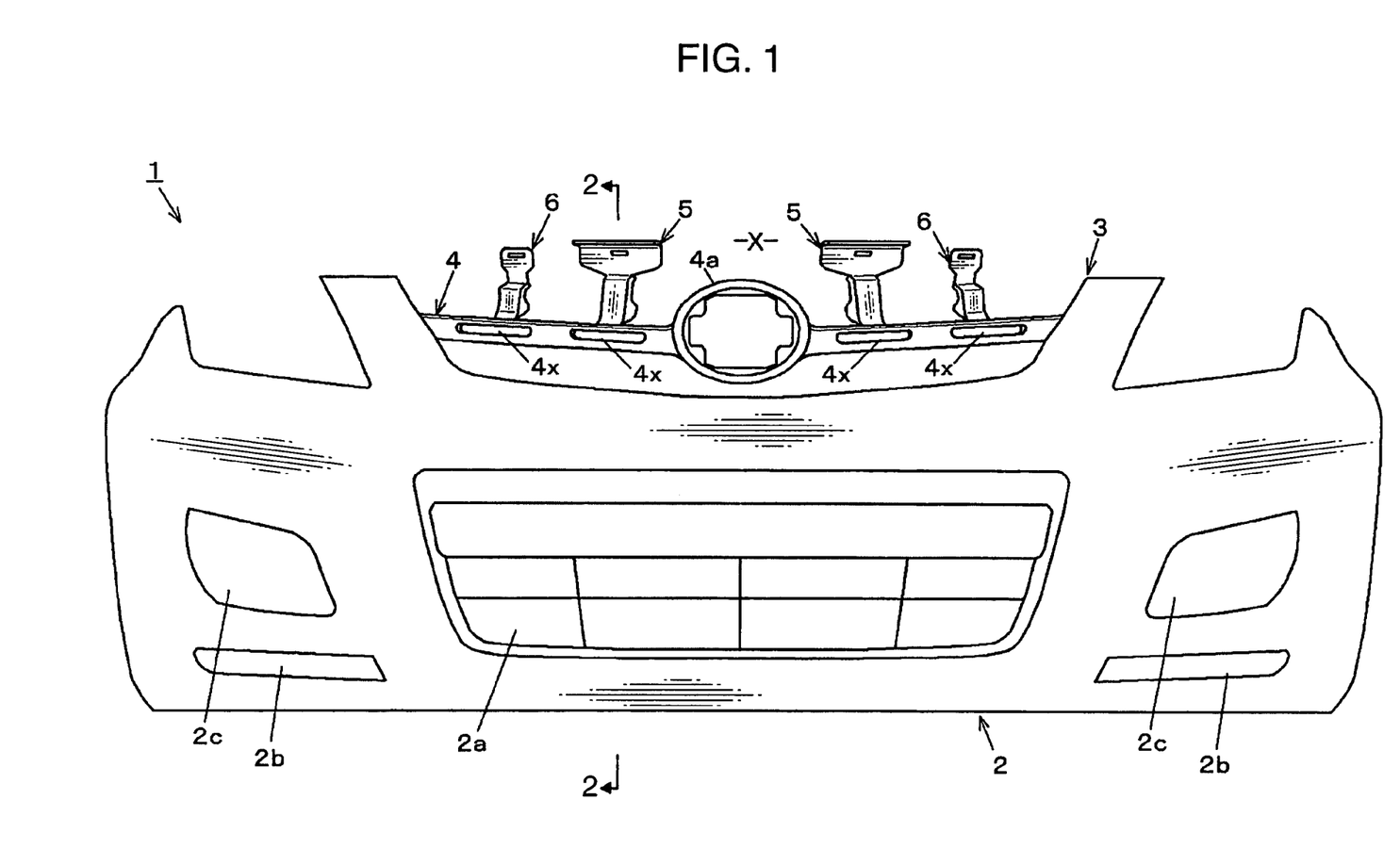
FIG. 1 is a schematic front view showing a bumper structure according to one embodiment of the present invention.
Figure 2:
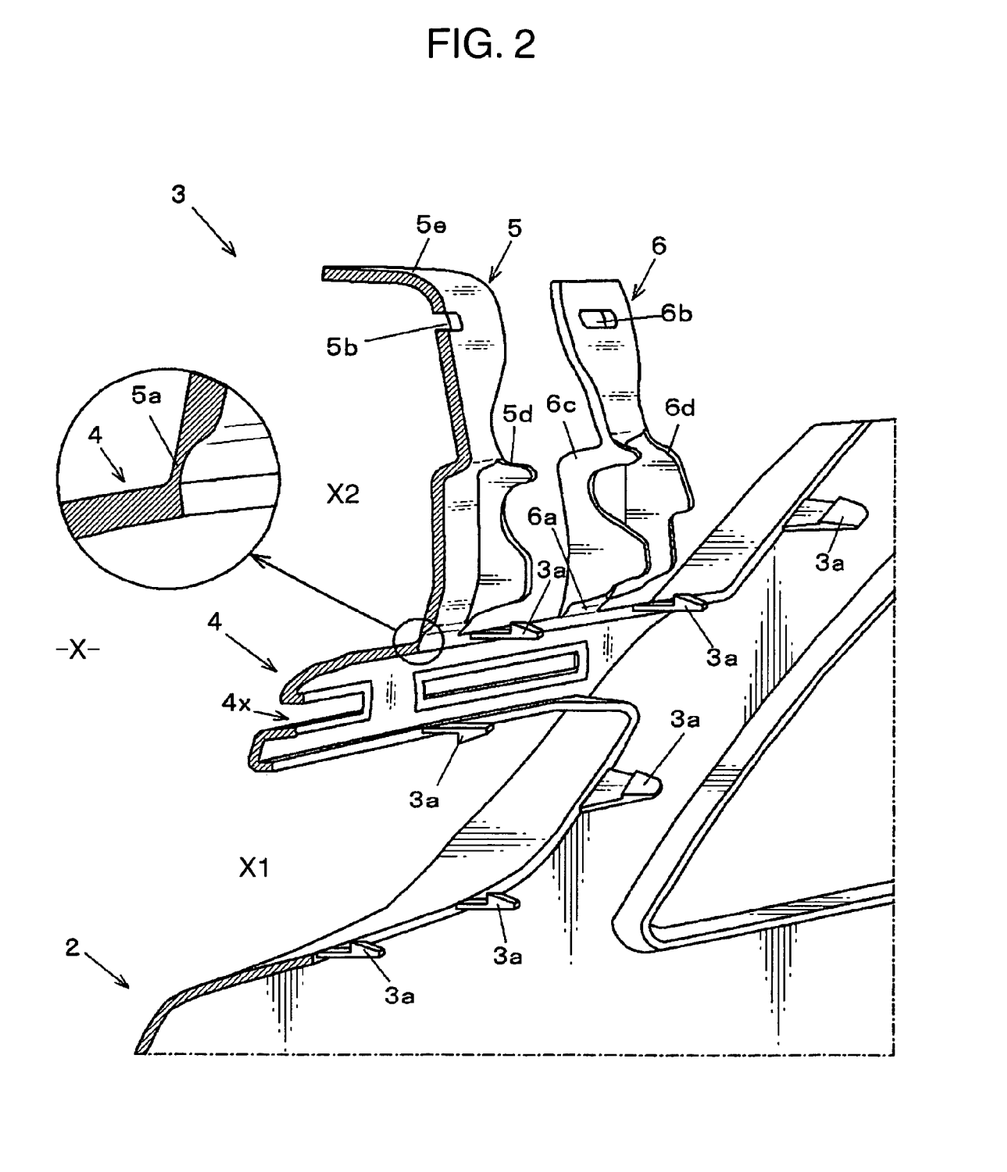
FIG. 2 is an enlarged sectional view showing a grill portion of the bumper structure, taken along the line 2-2 in FIG. 1.
Figure 3:
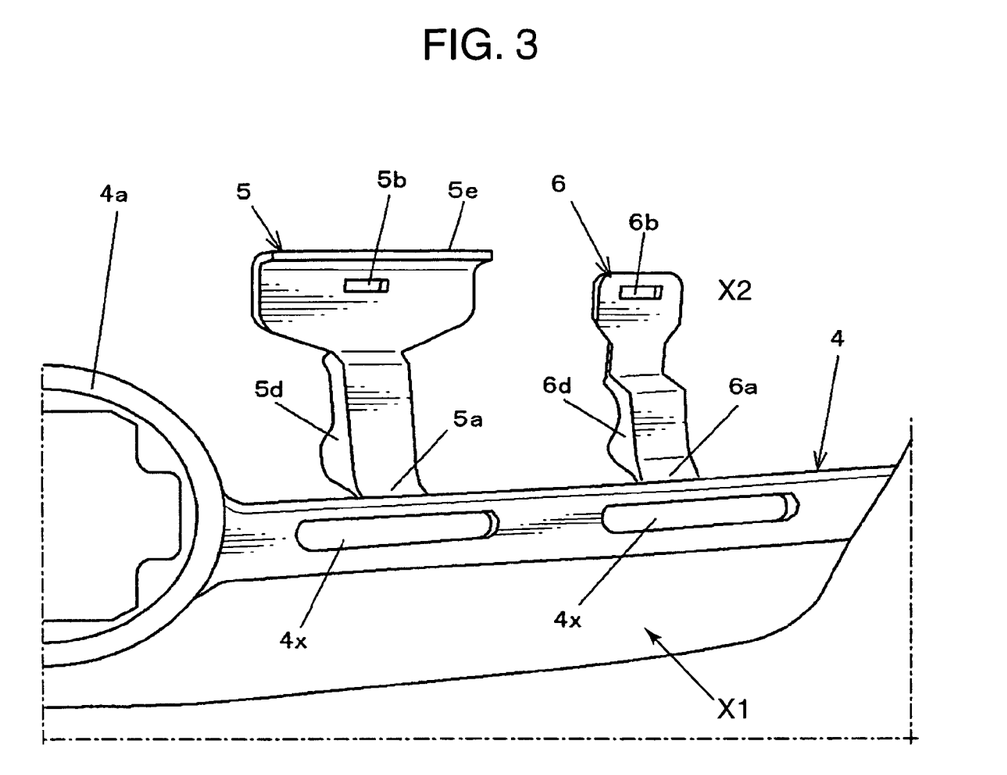
FIG. 3 is an enlarged view showing a right (in FIG. 1) region of a fin member 4 just after a bumper body and the grill portion are integrally molded.

With reference to the accompanying drawings, a vehicle bumper structure 1 according to one embodiment of the present invention will now be described. FIGS. 1 to 3 show the vehicle bumper structure 1 in a state just after it is formed through an injection molding process using polypropylene resin, and taken out of a mold. This bumper structure 1 comprises, as a fundamental component, a lower bumper body 2 and an upper grill portion 3. The bumper body 2 is designed to serve as a means to absorb a shock, and formed with a plurality of lower grills 2a, 2b, 2b and a plurality of lamp mounting holes 2c, 2c.

The grill portion 3 is formed with an opening X for introducing air into an engine compartment to cool a radiator (not shown). A single fin member 4 is integrally formed with the grill portion 3 to extend horizontally in such a manner as to bridge across the opening X so that said opening X is divided into a lower opening X1 and an upper opening X2. It should be noted that in the following description unless specifically indicated with either one of said lower opening X1 or the upper opening X2, use of the term opening X is mean to cover both opening X1 and opening X2. This fin member 4 is formed with a plurality of holes 4x, - - - , 4x. Further, an emblem mounting portion 4a for mounting an emblem (not shown) is formed in a central region of the fin member 4. First and second pairs of fin supports 5, 5, 6, 6 are disposed adjacent to the emblem mounting portion 4a, and each of the pairs are symmetrically arranged on opposite sides of the emblem mounting portion 4a. These fin supports 5, 5, 6, 6 are integrally formed in the fin member 4. As compared with the second pair of fin supports 6, 6 disposed relatively far from the emblem mounting portion 4a, the first pair of fin supports 5, 5 disposed relatively close to the emblem mounting portion 4a are formed to have a larger size so as to have a higher rigidity.

In this embodiment, an open zone X2 is formed on the upper side of the opening X of the grill portion 3, and each of the fin supports 5, 5, 6, 6 is formed to extend upward from the fin member 4 toward the open zone X2. Each of the fin supports 5, 5, 6, 6 has an anchor end, or a connection portion with the fin member 4, formed as a thin-wall portion (5a, 5a, 6a, 6a) adapted to allow the fin support (5, 5, 6, 6) to be folded thereabout in a direction (downward direction) opposite to an extension direction (upward direction) thereof.

Further, each of the fin member 4 and an edge of the openings X1, X2 of the grill portion 3 is formed with a plurality of engagement pins 3a, - - -, 3a adapted to allow two mesh-shaped members M1, M2 (see FIG. 7) to be attached thereto from the rear side of the bumper structure 1. Each of the fin supports 5, 5, 6, 6 has a distal end formed with an engagement hole (5b, 5b, 6b, 6b) engageable with a corresponding one of the engagement pins (3a, - - -, 3a) formed in the edge of the openings X1, X2 of the grill portion 3.

The fin member 4 has a rear surface formed with a step, and each of the fin supports 5, 5, 6, 6 has opposite lateral edges each formed with a rib (5c, 5d, 6c, 6d) protruding therefrom and having a shape conformable to that of the step (see FIGS. 2 to 5).

A combination of one of the engagement pins 3a, - - -, 3a and a corresponding one of the engagement holes 5b, 5b, 6b, 6b serves as engaging portion and an engaged portion, both of which can be in engagement state when being mated together. Note that throughout this specification, the term "engaged" or "engaging" is replaceable with the term "engagement". However, when the term "engaging portion (member)" is used, it is meant to be a portion having an engageable projection whereas when the term "engaged portion (member)" is used, it is meant to be a portion having a recess or a portion accommodating the engaging member. Accordingly, the engaging portion and the corresponding engaged portion can be interchangeably provided in the embodiments of this invention unless otherwise there is a specific description that prohibits to do so.

Figure 4:
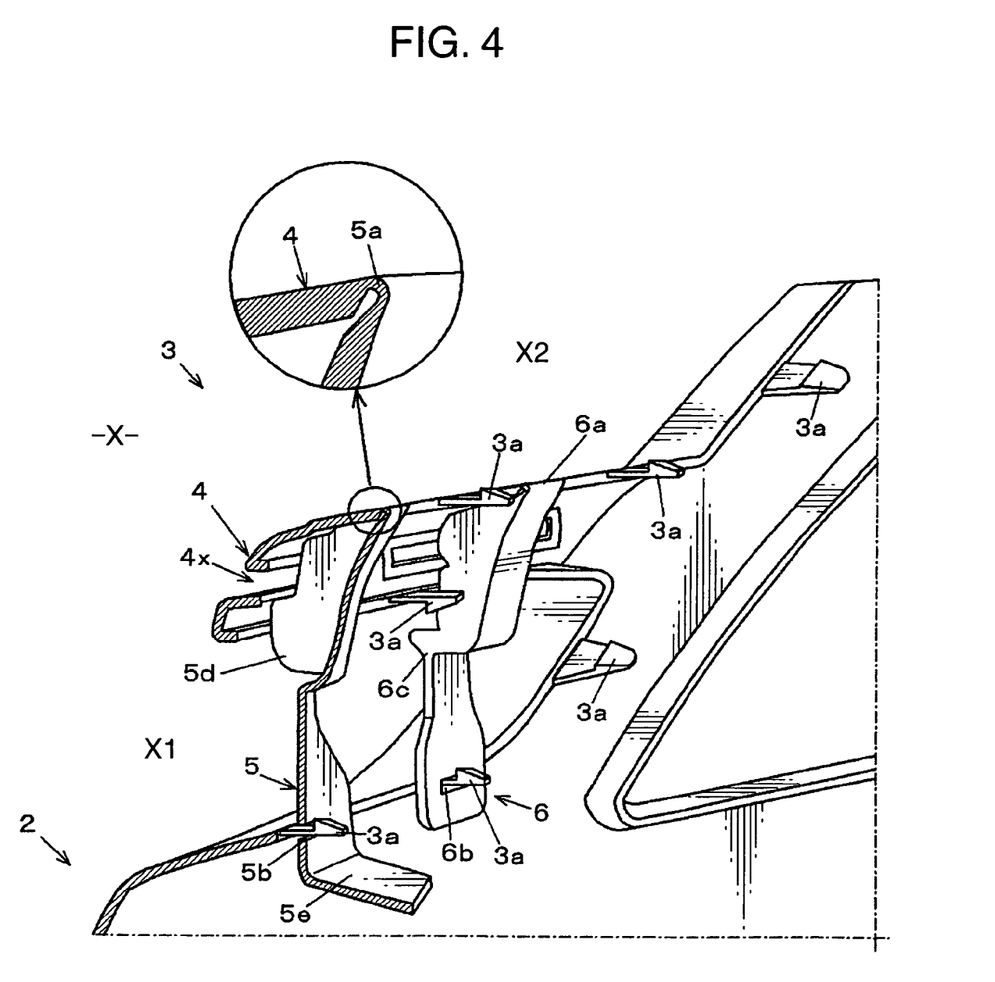
FIG. 4 is an enlarged sectional view showing the grill portion in a state after a fin support is folded about a thin-wall portion thereof.

An operation for folding each of the fin supports 5, 5, 6, 6 in the bumper structure according to this embodiment will be described below. FIG. 4 is an enlarged sectional view showing the grill portion 3 in a state after each of the fin supports 5, 5, 6, 6 is folded about the thin-wall portion (5a, 6a). As shown in FIG. 4, though this operation, the engagement hole (5b, 6b) formed in the distal end of the fin support (5, 6) is fitted onto the engagement pin (3a, - - -, 3a) formed in the edge of the opening X of the grill portion 3, to allow the fin support (5, 6) to be engaged with the edge of the opening X of the grill portion 3. Further, the ribs 5c, 5d, 6c, 6d are brought into contact with the rear surface of the fin member 4, while allowing respective distal edges of the ribs 5c, 5d, 6c, 6d to conform to the step of the rear surface of the fin member 4.

In this embodiment, when the bumper body 2 and the grill portion 3 is integrally formed together through an injection molding process, the open zone is formed in the upper side of the opening X of the grill portion 3, and each of the four fin supports 5, 5, 6, 6 is integrally formed in the fin member 4 in such a manner that the distal end thereof extends toward the open zone X1 or an unlimited upper end of the opening X2. Then, each of the fin supports 5, 5, 6, 6 is folded downward relative to the fin member 4 about the deformable thin-wall portion (5a, 6a) formed in the anchor end thereof, and engaged with the edge of the opening X1 of the grill portion 3 which is located adjacent to the bumper body 2. Through this operation, the fin member 4 is supported by the fin supports 5, 5, 6, 6. Then, after the fin member 4 is cooled and solidified, the easily-cuttable thin-wall portions 5a, 6a is cut off to remove the fin supports 5, 5, 6, 6 from the fin member 4.

Figure 5:
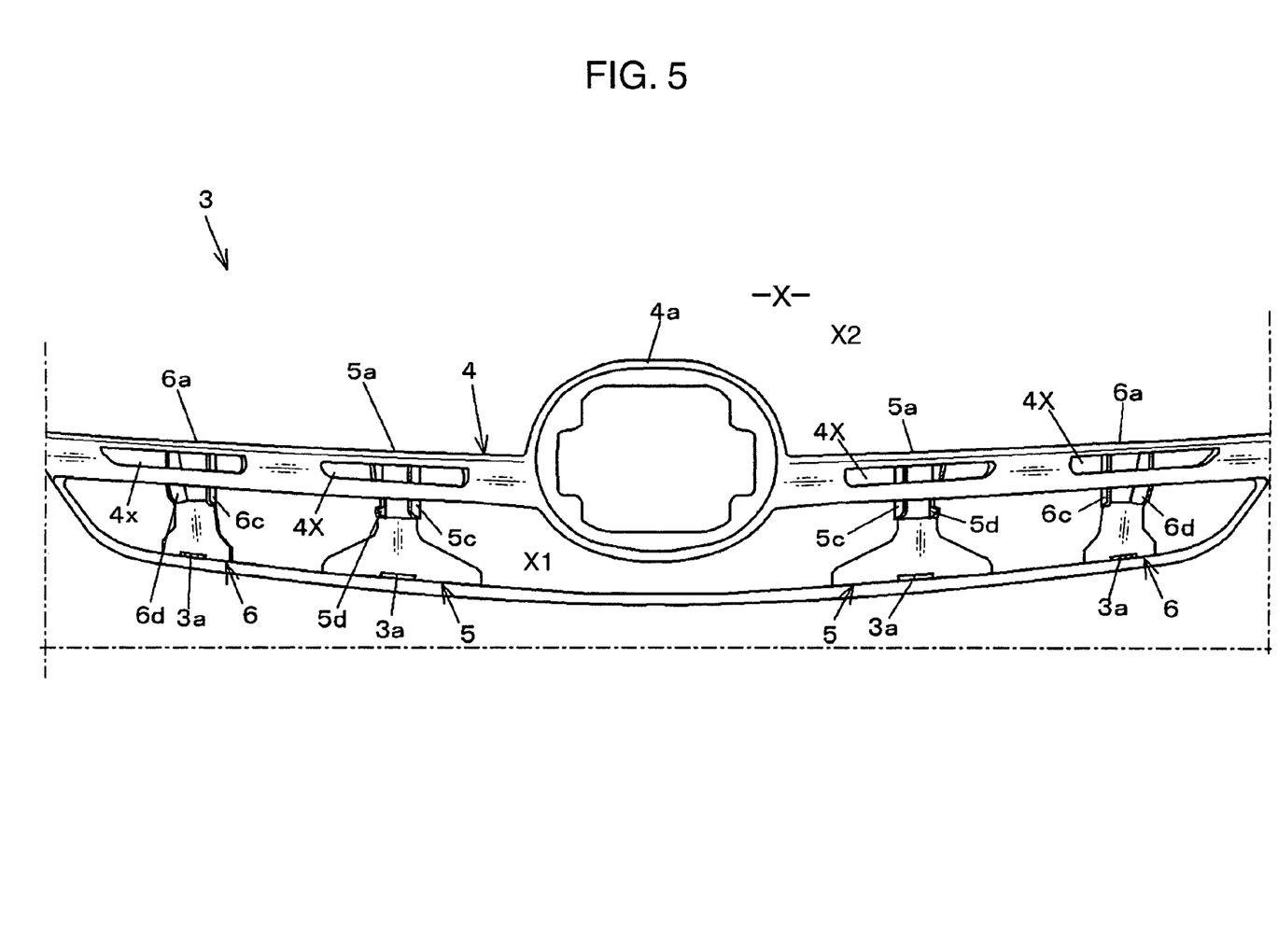
FIG. 5 is an enlarged front view showing the grill portion in a state after the fin support is folded about the thin-wall portion thereof.

FIG. 5 is a schematic front view showing the grill portion 3 in a state after each of the fin supports 5, 5, 6, 6 are folded about the thin-wall portion (5a, 6a). In this state, the first and second pairs of fin supports 5, 6 are engaged with the edge of the opening X1 of the grill portion 3, and the ribs 5c, 5d, 6c, 6d are in contact with the rear surface of the fin member 4.

In this manner, the fin member 4 is supported from below by the two pairs of fin supports 5, 6 to prevent the fin member 4 from being bent downward by its own weight before being cooled and solidified. Thus, an appearance of the grill portion 3 can be drastically improved in a simplified structure.

In addition, the anchor end of each pair of fin supports 5, 6 formed as the thin-wall portion (5a, 6a) allows the fin support (5, 6) to be readily folded about the thin-wall portion (5a, 6a), and thin-wall portion (5a, 6a) can be cut off to readily remove the fin support (5, 6) from the inside of the opening X1.

Further, in the above bumper structure, the open zone X2 is formed in the upper side of the opening X of the grill portion 3, and the two pairs of fin supports 5, 6 are designed to extend from the fin member 4 toward the open zone X2 in the state just after the injection molding of the bumper body 2 and the grill portion 3. Thus, the two pairs of fin supports 5, 6 can be formed using the open zone X2 or an unoccupied space in the opening X of the grill portion 3 without restriction in the extension direction of the two pairs of fin supports 5, 6. Thus, each of the fin supports 5, 5, 6, 6 can be readily formed to ensure a sufficient length allowing the fin support to be engaged with the edge of the opening X1 of the grill 3 portion located adjacent to the bumper body 2, in the state after the fin support is folded in a direction opposite to the extension direction thereof, so that the fin supports 5, 5, 6, 6 can reliably prevent downward bending of the fin member 4 due to its own weight so as to drastically improve the appearance of the grill portion 3.

Furthermore, in the above embodiment, the engagement pin 3a for achieving the engagement between the fin support (5, 6) and the edge of the opening X1 of the grill portion 3 located adjacent to the bumper body 2 is designed to additionally serve as an engagement pin adapted to allow a mesh-shaped member (mesh-shaped members M1, M2 in FIG. 7) to be attached thereto from the rear side of the bumper body 2. This makes it possible to eliminate the need for newly providing a component for providing the engagement between the bumper body 2 and the two pairs of fin supports 5, 6. Thus, an advantage of being able to prevent downward bending of the fin member 4 can be obtained while reducing the number of components, so as to drastically improve the appearance of the grill portion 3.

Figure 6:
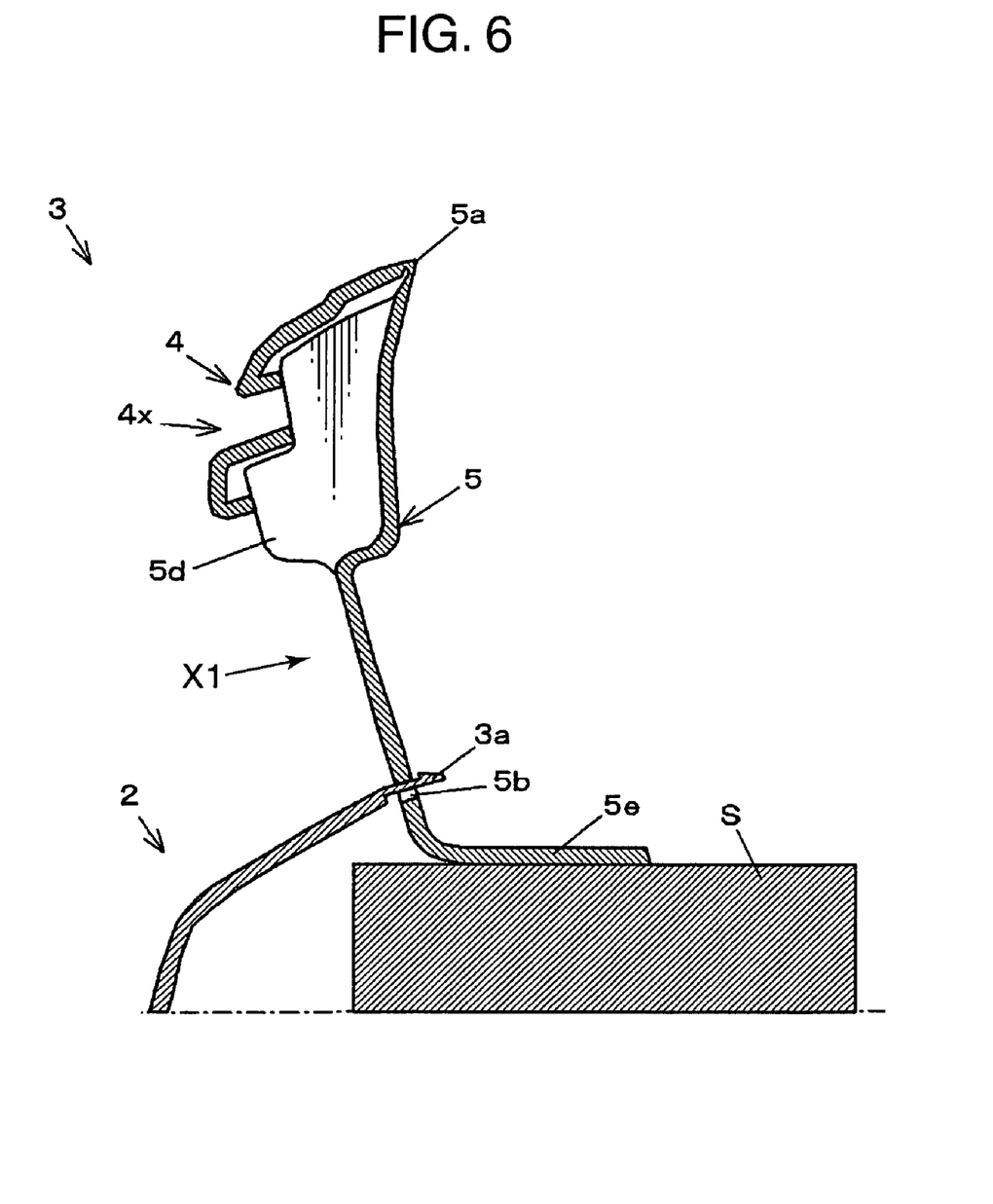
FIG. 6 is a side view showing the grill portion in FIG. 4.

FIG. 6 is a side view of the grill portion 3 in FIG. 4, in a state after one of the first pair of fin supports 5 located on the left side of the emblem mounting portion 4a in a front view of the bumper structure 1 is engaged with the bumper body 2.

When the bumper structure 1 produced by integrally forming the bumper body 2 and the grill portion 3 through an injection molding process is transported to a subsequent process, or subjected to a coating process, it is necessary to prepare a pedestal for supporting and holding the bumper structure 1.

In the above embodiment, each distal end of the first pair of fin supports 5 formed with the engagement hole 5b is bent to form a pedestal 5e having a L shape in side view, and the pedestal 5e is held by a jig S. Thus, when the bumper structure 1 having the bumper body 2 and the grill portion 3 is transferred or subjected to a coating process, the pedestal 5e can be held by the jig S stably and reliably.

In the above embodiment, the emblem mounting portion 4a for mounting an emblem is formed in the central region of the fin member 4. Generally, the emblem mounting portion 4a has a relatively large weight. Thus, when the bumper body 2 and the grill portion 3 are integrally formed through an injection molding process, the emblem mounting portion 4a is liable to cause a problem about downward bending in the central region of the fin member 4.

In the above embodiment, the first and second pairs of fin supports 5, 5, 6, 6 are disposed adjacent to the emblem mounting portion 4a, and each of the pairs are symmetrically arranged on opposite sides of the emblem mounting portion 4a, so as to support each of the opposite sides the emblem mounting portion 4a by an even force to reliably prevent the vicinity of the emblem mounting portion 4a from being bent downward by the weight of the emblem mounting portion 4a.

Further, each of the first pair of fin supports 5, 5 is designed to have a higher rigidity than that of the second pair of fin supports 6, 6. Thus, the vicinity of the emblem mounting portion 4a can be supported by the first pair of fin supports 5, 5 having a higher rigidity. This provides an advantage of being able to reliably prevent downward bending in the central region of the fin member 4.

Figure 7:
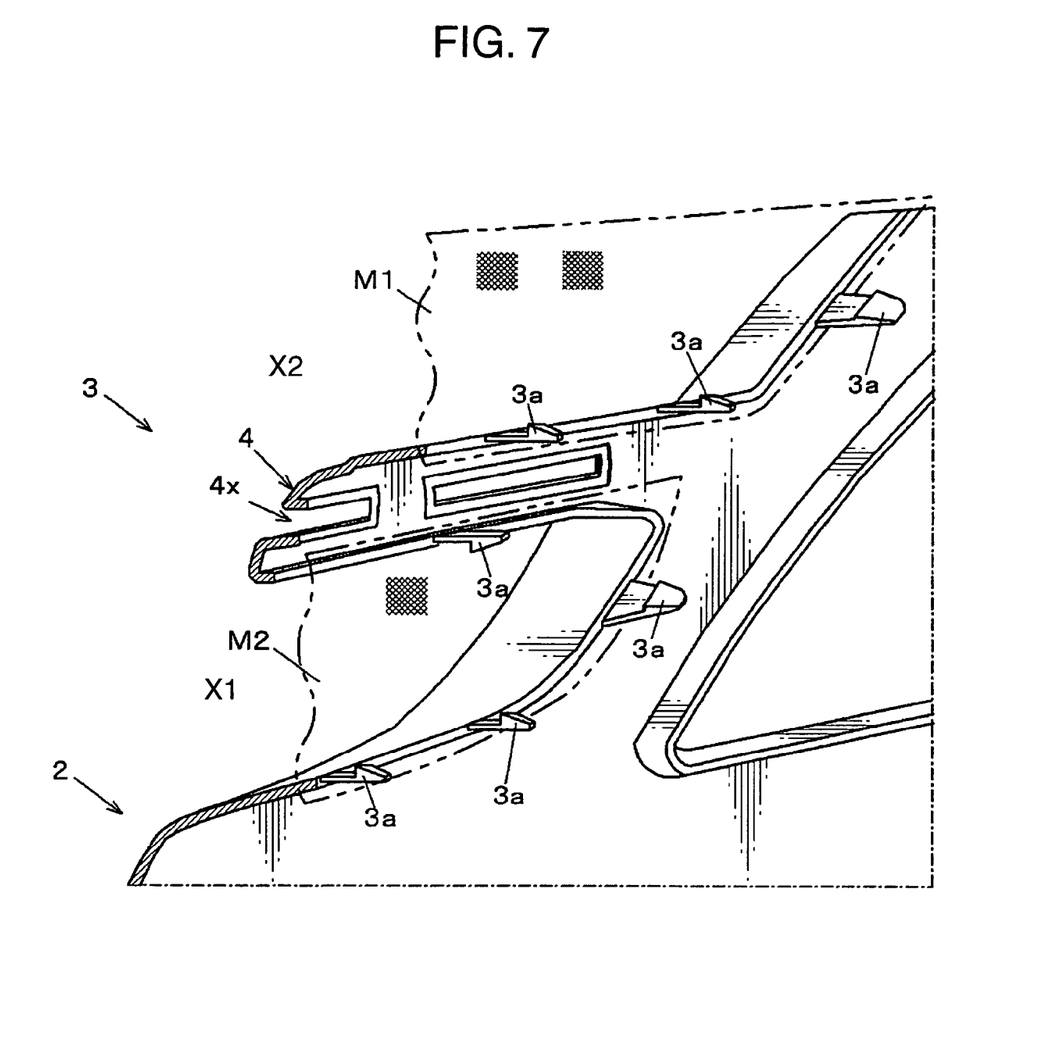
FIG. 7 is an enlarged sectional view showing the grill portion in a state when a mesh-shaped member is attached using an engagement pin after the fin support is removed from the inside of an opening of the grill portion.

FIG. 7 shows a state after the thin-wall portions 5a, 6a are cut off to remove the fin supports 5, 5, 6, 6 from the inside of the opening X1 after the fin member 4 is cooled and solidified and the operation for supporting the fin member is completed, and then the mesh-shaped members M1, M2 are attached from the rear side of the bumper structure 1 using the engagement pins 3a, - - -, 3a. Thus, the fin supports 5, 5, 6, 6 are removed in this way to prevent the fin supports from being viewed through a space between the fin member 4 and the edge of the opening X1 of the grill portion 3, so as to provide drastically enhanced appearance of the grill portion 3 as compared with the conventional structure.

As above, the fin supports 5, 6, which are originally unnecessary for an end product and desirable to be eliminated in view of appearance of the grill portion 3, are integrally formed in the fin member 4 during formation of the fin member 4, and used for supporting the fin member 4. This makes it possible to reliably obtain a plurality of advantages of being able to prevent downward bending of the fin member 4 and to stably hold the bumper structure 1 during transportation and coating of the bumper body 2 and the grill portion 3, in a simplified structure. Then, after obtaining these advantages, the thin-wall portions 5a, 6a are cut off to remove the fin supports 5, 6 from the support member 4 so as to reliably prevent deterioration in appearance of grill portion 3 which would otherwise be caused by the fin supports 5, 6 remaining within the opening X1 of the grill portion 3.

The present invention has been described in connection with the specific embodiment as the best mode thereof. It is understood that various modifications and changes may be made therein without departing from the spirit and scope of the present invention.

When the relatively open zone is formed on the lower side of the opening X, the fin supports 5, 6 may be formed to extend downward, during an injection molding process, and then folded about the thin-wall portions 5a, 6a to allow the fin supports 5, 6 to be engaged with an upper edge of the opening X2 of the grill portion 3. Thus, the fin member 4 can be supported by the fin supports 5, 6 in a hanging manner to obtain an advantage of being able to prevent downward bending of the fin member 4. Note that "the relatively large open zone" is to mean a opening area large and vertically long enough to earn a sufficient length of the downwardly extending fin support during an injection mold process so that when the fin support is folded upward, the lead end thereof can reach the upper edge of the opening X2 of the grill portion 3.

Further, when the opening X1, X2 has no limitless open zone, i.e., formed as an enclosed opening, the fin supports 5, 6 may be formed to extend either one of upward and downward directions, and then folded about the thin-wall portions 5a, 6a to allow the fin supports 5, 6 to be engaged with an edge of the opening X of the grill portion 3. In this case, the fin member 4 may be supported by the fin supports 5, 6 from below or in a hanging manner to obtain the same advantage of being able to prevent downward bending of the fin member 4. Note that in this case, the vertical position of the fin member 4 with respect to the opening X or size of the opening is to be carefully engineered in such a manner that the fin member 4 is lowered with respect to the opening X or a wider space is formed in the upper opening in case originally upward extending fin support is to be formed in the injection process so that the fin support can be made long enough to be folded downward to reach the lower edge of the opening X1 and vice versa.

As one of the preferred embodiments, the open zone having no frame surrounding the opening in the above embodiment is formed on the upper side of the opening X of the grill portion 3. However, it is possible to form a closed opening with a relatively large open zone on the upper side of the opening X of the grill portion. Moreover, it is also possible to form a downward opening zone having no frame surrounding the opening in case a grill portion is formed on the lower side of the bumper structure.

As to the industrial applicability according to the present invention, in a bumper structure adapted to be attached to a front end of a vehicle, a fin member is supported after integrally forming a bumper body and a grill portion together, to prevent the fine member from being bent downward by its own weight, and then fin member is removed to avoid a problem about deterioration in appearance of the grill portion which would otherwise be caused by the fin support remaining within the grill portion, so as to provide drastically enhanced appearance of the grill portion. The present invention may be suitably applied to a wide range of the technical field of a bumper adapted to be attached to a front end of a vehicle.

In sum, the present invention provides a bumper structure made of a resin material and adapted to be attached to a front end of a vehicle, which comprises: a bumper body serving as a main body of the bumper structure; a grill portion integrally formed with the bumper body to have an air-intake opening therein; a fin member integrally formed in the grill portion to extend horizontally in such a manner as to bridge across the opening of the grill portion; a fin support integrally formed in the fin member to extend vertically from the fin member and have an anchor end formed as a thin-wall portion adapted to allow the fin support to be folded thereabout in a direction opposite to an extension direction thereof; and an engaging portion formed at either one of a distal end of said fin support and an edge of said grill portion and an engaged portion formed at the other one of said distal end of said fin support and said edge of said grill portion such that said engaging portion and said engaged portion are in engagement with each other when said fin support is folded about said thin-wall portion in said opposite direction.

According to the above bumper structure of the present invention, after completion of an injection molding process, the fin support is folded to allow the distal end thereof to be kept in engagement with the edge of the opening of the grill portion until the molded resin is cooled and solidified. Specifically, when the fin support is formed to extend upward from the fin member, it is folded downward to support the fin member from below. When the fin support is formed to extend downward from the fin member, it is folded upward to support the fin member from above in a hanging manner. In either case, the fin support can eliminate the problem that the fin member is bent downward by its own weight. Further, the anchor end of the fin support formed as the thin-wall portion allows the fin support to be readily folded.

After the molded resin is cooled and solidified, the fin support used for preventing bending (i.e., downward sagging) of the fin member can be readily cut away at its anchor end formed as the thin-wall portion. That is, the non-aesthetic fin support can be removed from the opening of the grill portion to maintain aesthetic quality of the bumper structure serving as a vehicle's face.

As above, the feature of the present invention is in that a fin support which will become unnecessary after being utilized in a production process of the bumper structure is designed to be integrally formed with the bumper structure and then readily removed before the bumper structure is attached to a front end of a vehicle. This makes it possible to provide drastically enhanced appearance of the grill in a simplified structure.

In the bumper structure of the present invention, an open zone (limitless free open area) is formed either above or below said fin member and said fin support is formed to extend from the fin member into the open zone.

According to the bumper structure having the above feature, the fin support can be formed to extend toward the open zone or an open-ended space in its extension direction so as to ensure a sufficient length.

In the bumper structure of the present invention, one of the engaging and the engaged portions, formed in the edge of the opening of the grill portion, may be designed to additionally serve as a mounting member adapted to mount a mesh-shaped member for covering the opening of the grill portion.

According to the bumper structure having the above feature, the need for newly providing a component for providing the engagement between the distal end of the fin support and the edge of the opening of the grill portion can be eliminated to facilitate reduction in production cost of the bumper structure.

In the bumper structure of the present invention, the distal end of the fin support may be integrally formed with a pedestal portion for holding the bumper structure in a state after the distal end is engaged with the edge of the opening of the grill portion.

According to the bumper structure having the above feature, the pedestal portion can be used for reliably holding the bumper structure using a jig or the like during transportation, storage or coating of the bumper structure. In the holding state, the bumper structure is supported by the edge of the opening of the grill portion which is located adjacent to the bumper body having a higher strength, for example, than the fin member. This makes it possible to stably hold the bumper structure while preventing damages of the bumper structure.

The bumper structure of the present invention may include an emblem mounting portion formed on the fin member and adapted to mount an emblem, and at least one fin support is disposed on lateral sides with respect to the emblem mounting portion and is disposed adjacent to the emblem mounting portion.

According to the bumper structure having the above feature, the fin member can be supported adjacent to and at opposite sides of the emblem mounting portion which is relatively heavy and liable to cause downward bending (sagging) due to its own weight. This makes it possible to more effectively prevent bending of the fine member.

This application claims priority from Japanese Patent Application Serial No. 2005-11439, filed with Japan Patent Office on Jan. 19, 2005. Thus, it is deemed that the contents of said Japanese Patent Application constitutes part of the present application as incorporation by reference.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A bumper structure made of a resin material and adapted to be attached to a front end of a vehicle, comprising:
    a bumper body serving as a main body of said bumper structure;
    a grill portion integrally formed with said bumper body, said grill portion having an air-intake opening therein;
    a fin member integrally formed with said grill portion to extend horizontally in such a manner as to bridge across said opening of said grill portion;
    a fin support integrally formed with said fin member to extend vertically from said fin member, said fin support having an anchor end formed as a thin-wall portion adapted to allow said fin support to be folded thereabout in a direction opposite to an original extension direction thereof;
    an engaging portion formed at either one of a distal end of said fin support and an edge of said grill portion and an engaged portion formed at the other one of said distal end of said fin support and said edge of said grill portion such that said engaging portion and said engaged portion are in engagement with each other when said fin support is folded about said thin-wall portion in said opposite direction.

2. The bumper structure as defined in claim 1, wherein an open zone is defined above said fin member and said fin support is formed to extend from said fin member in said open zone.

3. The bumper structure as defined in claim 1, wherein one of said engaging and said engaged portions which is formed at the edge of said grill portion is designed to additionally serve as a mounting member adapted to mount a mesh-shaped member for covering the opening of said grill portion.

4. The bumper structure as defined in claim 1, wherein the distal end of said fin support is integrally formed with a pedestal portion for holding said bumper structure in a state after said distal end of said fin support is engaged with the edge of the opening of said grill portion.

5. The bumper structure as defined in claim 1, wherein an emblem mounting portion is formed on said fin member and adapted to mount an emblem; and said fin support is disposed adjacent to said emblem mounting portion, and arranged at least one on each of the laterally opposite sides of the fin member with respect to said emblem mounting portion.

* * * * *